US008995655B2

(12) United States Patent
Spalka et al.

(10) Patent No.: US 8,995,655 B2
(45) Date of Patent: Mar. 31, 2015

(54) METHOD FOR CREATING ASYMMETRICAL CRYPTOGRAPHIC KEY PAIRS

(75) Inventors: Adrian Spalka, Koblenz (DE); Jan Lenhardt, Koblenz (DE)

(73) Assignee: Compugroup Medical AG, Koblenz (DE)

( * ) Notice: Subject to any disclaimer, the term of this patent is extended or adjusted under 35 U.S.C. 154(b) by 235 days.

(21) Appl. No.: 13/256,364

(22) PCT Filed: Mar. 4, 2010

(86) PCT No.: PCT/EP2010/052733
§ 371 (c)(1),
(2), (4) Date: Nov. 22, 2011

(87) PCT Pub. No.: WO2010/105912
PCT Pub. Date: Sep. 23, 2010

(65) Prior Publication Data
US 2012/0063594 A1 Mar. 15, 2012

(30) Foreign Application Priority Data

Mar. 20, 2009 (DE) .................. 10 2009 001 719

(51) Int. Cl.
H04L 9/00 (2006.01)
G06F 21/62 (2013.01)
H04L 9/08 (2006.01)
(52) U.S. Cl.
CPC .......... G06F 21/6209 (2013.01); H04L 9/0836 (2013.01)
USPC ................ 380/44; 380/277; 380/45
(58) Field of Classification Search
CPC .................................... H04L 9/0836
USPC ............... 380/44, 277; 713/150–181
See application file for complete search history.

(56) References Cited

U.S. PATENT DOCUMENTS 7,643,817 B2 * 1/2010 Klug et al. ............ 455/411
2005/0238175 A1 * 10/2005 Plotkin et al. ............ 380/281
(Continued)

FOREIGN PATENT DOCUMENTS

| DE | 10134489 A1 | 1/2003 |
| DE | 10134489 B4 | 1/2003 |
| WO | 2008026184 A2 | 3/2008 |

OTHER PUBLICATIONS

Kuo et al, Cryptographic key assignment scheme for dynamic access control in a user hierarchy, Sep. 22, 1999, IEE Proceedings—vol. 146, Issue 5, Digital Object Identifier 10.1049/ip-cdt 19990311.*
Sandhu R S, On some cryptographic solutions for access control in a tree hierarchy, Proceedings 1987 Fall Joint Computer Conference—Exploring Technology: Today and Tomorrow.
Ehud Gudes, The Design of Cryptography Based Secure File System, IEEE Transactions on Software Engineering, Sep. 1980.
Kuo Fh et al, Cryptographic Key Assignment Scheme for Dynamic Access Control in a User Hierarchy, IEE Proceedings: Computers and Digital Techniques, Sep. 22, 1980.
(Continued)

Primary Examiner — Andrew Nalven
Assistant Examiner — Khang Do

(57) ABSTRACT

The invention relates to a method for creating a set of asymmetrical cryptographic key pairs, wherein the set of key pairs has a first key pair (K1) and a second key pair (K2), wherein the first key pair is formed by a first private (G1) and a first public key (O1) and the second key pair is formed by a second private (G2) and a second public key (O2), wherein a first cipher (C_G2_O1) is allocated to the first and second key pair, wherein the first cipher is formed by an encryption of the second private key (G2) with the first public key (O1), having the following steps: adding a third asymmetrical cryptographic key pair (K3) to the set of key pairs, wherein the third key pair is formed by a third private (G3) and a third public key (O3); creating a second cipher (C_G3_O1) by encrypting the third private key (G3) with the first public key (O1); storing the second cipher (212; 186), wherein the set of key pairs has a directed graph structure.

17 Claims, 6 Drawing Sheets

(56) References Cited

U.S. PATENT DOCUMENTS

Figure 1:
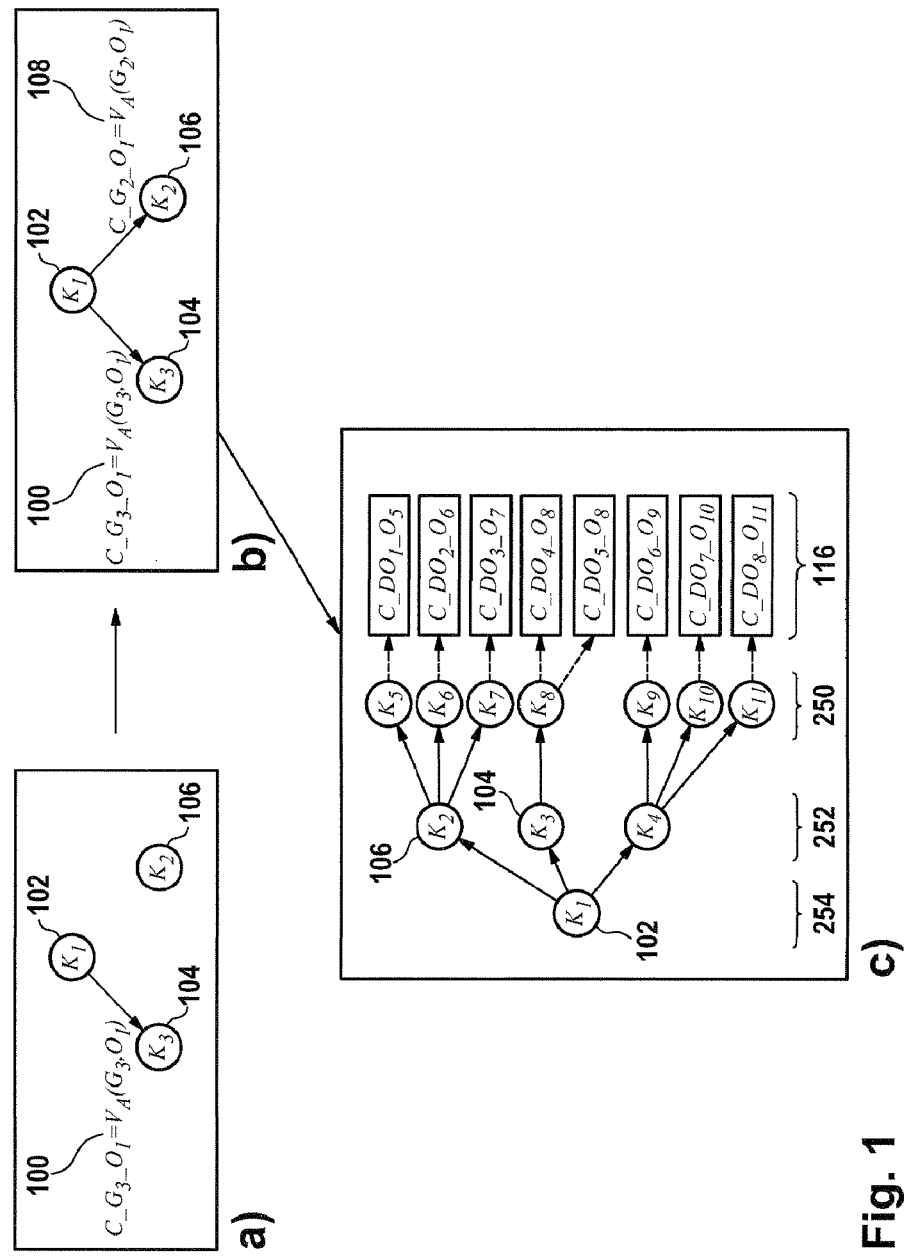

| | | | |
|---|---|---|---|
| 2008/0022361 A1 | 1/2008 | Bharadwaj et al. | |
| 2008/0267394 A1* | 10/2008 | Nan et al. | 380/44 |
| 2009/0037728 A1* | 2/2009 | Kamikura | 713/156 |
| 2009/0041249 A1* | 2/2009 | Tanaka et al. | 380/277 |
| 2009/0257597 A1* | 10/2009 | Bromley et al. | 380/282 |
| 2009/0307030 A1* | 12/2009 | Honda | 705/7 |

OTHER PUBLICATIONS

Atallah M J et al, Dynamic and Efficient Key Management for Access Hierarchies, Proceedings of the 12th ACM Conference on Computer and Communications Security, Nov. 7-11, 2005, Alexandria, VA.

Chung et al, Access Control in User Hierarchy Based Elliptic Curve Cryptosystem, Information Sciences, Oct. 2007, Amsterdam, NL.

* cited by examiner

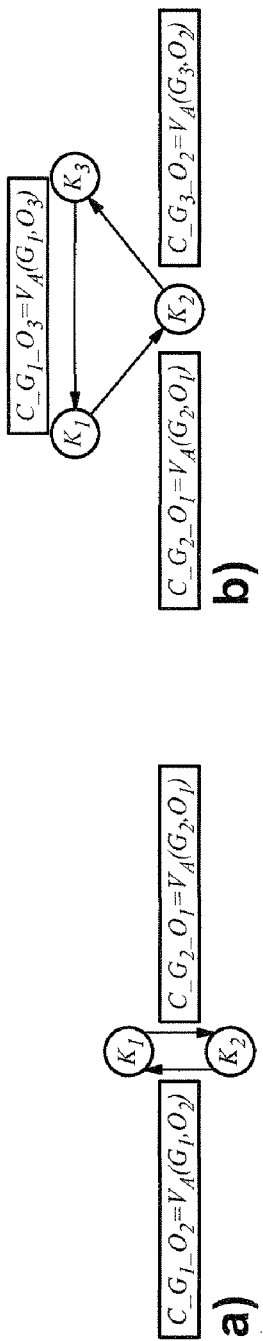
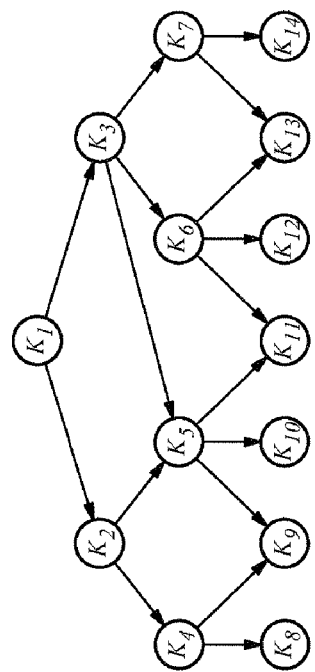
Fig. 3
Fig. 4

METHOD FOR CREATING ASYMMETRICAL CRYPTOGRAPHIC KEY PAIRS

The invention relates to a method for generating a set of asymmetric cryptographical key pairs, a data processing system for generating a set of asymmetric cryptographical key pairs, an appropriate computer program product and also a method for providing ciphers, a data processing system for providing ciphers and an appropriate computer program product.

Chip cards are today used in diverse forms for encrypting and decrypting data. One field of application for chip cards is what is known as the electronic health card, which is intended to replace the health insurance card in Germany in future. The aim of this is to make data transmission between medical service providers, health insurance companies, pharmacies and patients less expensive in future, to simplify it and to speed it up. This also includes allowing access to an electronic doctor's letter, an electronic patient record and an electronic prescription, inter alia, using the electronic health card.

It is therefore possible for medical data objects (MDOs), such as an electronic doctor's letter, an electronic patient record or an electronic prescription, to be stored on a central server in encrypted and digitally signed form. In this case, encryption is preferably performed using a symmetric key which is generated at random individually for each new medical data object in an electronic patient record, such as an electronic doctor's letter or an electronic prescription. The symmetric key itself, once created, is encrypted, for example with a public key, and is stored on the central server together with the encrypted medical data objects. This public key used for encryption forms a cryptographical asymmetric key pair together with a private key, which is stored on the electronic health card. This ensures that access to the encrypted medical data objects is possible exclusively using the secret health card key. In the event of such access, the encrypted symmetric key is first of all decrypted using the secret health card key, and the decrypted symmetric key can then be used for further decryption of the medical data objects. If creation of an MDO also involves a digital signature being generated with the secret health card key, it is subsequently possible to verify the integrity of the MDO and the authenticity of the MDO generator using the digital signature.

The prior art discloses various systems for generating and managing cryptographical keys. By way of example, WO 2008/026184 A2 discloses a hierarchic key management system for accessing encrypted data. U.S. Ser. No. 10/2008/0022361 describes hierarchic rights management for a computer file system. DE 101 34 489 B4 discloses an asymmetric cryptography method for recovering a secret key.

US 20050238175 A1 describes a method for rapidly erasing data stored in encrypted form by erasing the key which was used to encrypt the data. The key may have been encrypted by a further key, which takes a superordinate place within an encryption hierarchy and which in turn may have been encrypted by a hierarchically superordinate key. Instead of, as in previously known methods, erasing the references to the data or finally erasing sensitive data by overwriting other data multiple times (disadvantage: high time involvement), 20050238175 A1 involves all data which are hierarchically subordinate to a particular key in the encryption hierarchy being erased rapidly and irretrievably by erasing this key. In this context, "hierarchically subordinate" means that the data have either been encrypted directly by the erased key or have been encrypted by one of the keys which were encrypted by the erased key.

In order to counter loss of cryptographical key pairs, DE 101 34 489 B4 proposes an asymmetric cryptography method which uses recovery certificates and what are known as recovery cards to propose encrypting the secret key of a computer device with keys from at least two different recovery computer devices and creating an appropriate number of recovery certificates which have the encrypted key. This allows the secret key to be recovered and used without it being available in plain text outside of a smart card.

By contrast, the invention is based on the object of providing an improved method for generating a set of asymmetric cryptographical key pairs, a method for providing ciphers and also appropriate data processing systems and computer program products.

The objects on which the invention is based are each achieved by means of the features of the independent patent claims. Preferred embodiments of the invention are specified in the dependent patent claims.

The invention provides a method for generating a set of asymmetric cryptographical key pairs, wherein the set of key pairs has a first key pair and a second key pair, wherein the first key pair is formed by a first private key and a first public key and the second key pair is formed by a second private key and a second public key, wherein the first and second key pairs have an associated first cipher, wherein the first cipher is formed by encrypting the second private key with the first public key, wherein the method comprises the steps of:
addition of a third asymmetric cryptographical key pair to the set of key pairs, wherein the third key pair is formed by a third private key and a third public key,
generation of a second cipher by encrypting the third private key with the first public key,
storage of the second cipher.

Without restricting the general nature, it is subsequently assumed that all the cryptographical key pairs under consideration are designed in accordance with a cryptosystem based on elliptic curves. However, the basic principle can also be applied to any other types of methods for generating asymmetric keys, such as the RSA method, the Rabin method, the Elgamal method or the like. In addition, the following designations apply:

Let $K_i=(G_i, O_i)$ where $i=1, 2, 3, \ldots$ denote an asymmetric cryptographical key pair.

Let $G_i$ denote the secret key pair component or "the secret key" of an asymmetric cryptographical key pair $K_i$.

Let $O_i$ denote the public key pair component or "the public key" of an asymmetric cryptographical key pair $K_i$.

Let $V_A(DO, O_i)$ denote an encryption function which is based on an asymmetric cryptosystem and which is performed on a data object DO using a public key $O_i$.

Let $C\_DO\_O_i=V_A(DO, O_i)$ denote a "cipher" or the result of the encryption function $V_A$, applied to the data object DO using the public key $O_i$.

Let $E_A(C\_DO\_O_i, G_i)=DO$ denote a decryption function which is based on an asymmetric cryptosystem and which is performed on an encrypted data object $C\_DO\_O_i$ using a secret key $G_i$. In this case, $G_i$ forms an asymmetric cryptographical key pair together with the public key $O_i$ used for the encryption of $C\_DO\_O_i$.

The core of the invention is formed by the linking of two asymmetric cryptographical key pairs $K_1$ and $K_2$ which are designed in accordance with an arbitrary asymmetric cryptosystem. In this case, the link between the two key pairs is produced by encrypting the secret key $G_2$ from the second key pair $K_2$ with the public key $O_1$ from the first key pair $K_1$ and storing the cipher $C\_G_2\_O_1=V_A(G_2, O_1)$. This storage of $C\_G_2\_O_1$ can be effected in the same memory in which all the public keys $O_i$ are also stored. This memory is subsequently called the "public key infrastructure" or "PKI".

The storage and retrievability of the cipher $C\_G_2\_O_1$ produces a dependency between the key pairs $K_1$ and $K_2$: a user who is in possession of the secret key $G_1$ can use it to decrypt not only all data objects encrypted with the associated public key $O_1$ but also the cipher $C\_G_2\_O_1$, that is to say the encrypted secret key $G_2$ from the key pair $K_2$. The user can then also use $G_2$ to decrypt all data objects encrypted with the public key $O_2$ from the key pair $K_2$.

The dependency between the two key pairs $K_1$ and $K_2$ which arises through the storage of $C\_G_2\_O_1$ can be shown as a directional graph in which the key pairs $K_1$ and $K_2$ are shown as nodes in the graph and the publicly stored cipher $C\_G_2\_O_1 = V_A(G_2, O_1)$ is shown as the directional edge from $K_1$ to $K_2$ between the two nodes. The connection from $K_1$ to $K_2$ thus states that the cipher $C\_G_2\_O_1 = V_A(G_2, O_1)$ is stored publicly and hence the secret key $G_2$ from the key pair $K_2$ is likewise accessible given possession of the secret key $G_1$ from the key pair $K_1$.

Embodiments of the invention have the advantage that a secret key from a single key pair allows access to be gained to the secret keys from a plurality of key pairs. If data are encrypted with the second or third public key, for example, knowledge of the first secret key suffices in order to perform data decryption thereby using the first and second ciphers.

In accordance with one embodiment of the invention, the method also comprises the steps of addition of an asymmetric cryptographical successor key pair to the set of key pairs, wherein the successor key pair is formed by a private and a public successor key, wherein a precursor key pair is formed by a key pair from the set of key pairs, wherein the precursor key pair has a private and a public precursor key. The method continues with the generation of a third cipher by encrypting the private key from the successor key pair with the public key from the precursor key pair and with the storage of the third cipher.

A precursor key pair is an arbitrary key pair from the set of key pairs. The successor key pair is an arbitrary further additional key pair which is added to the set of key pairs, this involving the production of a dependency between the precursor key pair and the successor key pair by generating a cipher. The cipher is generated by encrypting the private key from the successor key pair with the public key from the precursor key pair.

The graph can thus be developed such that a new node with one or more edges or a new edge is added to existing nodes.

In accordance with a further embodiment of the invention, the set of key pairs has a directional graph structure, wherein the nodes in the graph represent the key pairs, wherein a dependency between a precursor key pair and a successor key pair, which directly follows the precursor key pair in the graph, is formed by a cipher, wherein the cipher is formed by encrypting the private key from the successor key pair with the public key from the precursor key pair, wherein, except for the key pair which forms the root node in the graph, every key pair in the graph is dependent on another key pair by virtue of at least one cipher.

It is therefore a simple matter to build logical structures, for example by using as a graph a tree structure which allows key pairs which are dependent on one another by virtue of the ciphers to be accessed hierarchically. A user who has one of the key pairs in the graph structure is therefore able to use all subsequent key pairs for encryption and decryption processes. By contrast, key pairs which are not situated in the path of the graph structure, subsequently the key pair which a user has, are therefore outside of the access range of the user, which makes it a simple matter to implement hierarchic structures: thus, various hierarchy levels in the graph can be allocated to various user groups, so that overall the hierarchic structure of a company organization can easily be mapped, for example. A key pair from a root node is allocated to a management, for example, which is therefore able to have access to all subsequent key pairs for all encryption and decryption processes. One hierarchy level below contains key pairs which are associated with individual department heads. Subordinate to these key pairs are again key pairs for individual employees who are merely intended to be able to access encryption and decryption processes in their specific work area.

However, it should be noted that the graph structure described is not just limited to simple tree structures but rather generally permits any type of graphs, such as acyclic or cyclic graphs. In general, it is therefore possible to map any types of networks by means of which key pairs are related in complex fashion. By way of example, one field of application therefor may be secure data interchange or specifically secure communication in what are known as online communities (community platform), in which a multiplicity of users in a network, such as the Internet, are in contact with one another in order to exchange information.

In accordance with a further embodiment of the invention, except for the key pair which forms the root node in the graph, every key pair in the graph is dependent on another key pair by virtue of precisely one cipher.

In accordance with a further embodiment of the invention, the set of key pairs has two arbitrary key pairs with one private and one public key each, wherein the method also comprises the steps of generation of a fourth cipher by encrypting the private key from the first key pair from the arbitrary key pairs with the public key from the second key pair from the arbitrary keys pairs, and storage of the fourth cipher. Such extension of the set of key pairs is therefore independent of the use of precursor and successor key pairs and allows the linking of two arbitrary key pairs in a graph of key pairs.

By way of example, it is thus possible to temporarily produce a dependency between two key pairs which enables a user to use both key pairs and the successors thereof for encryption and decryption processes, for example over a certain period of time. If a further link between the two key pairs needs to be canceled at a later time, it suffices for the ciphers linking the two key pairs to be rendered no longer accessible, e.g. to be erased, for this corresponding user.

In accordance with a further embodiment of the invention, the ciphers are stored in a trustworthy station. Preferably, classification features are also stored together with the ciphers, wherein the classification features stipulate a validity for the ciphers, wherein the validity indicates that use of the ciphers for further data processing processes is intended to be prevented when the validity has expired; in particular, the cipher in question can be erased when the validity has expired. This ensures that access to the ciphers can be controlled.

Classification features for the validity of key pairs within information system sessions may be:

Validity on the basis of time interval: The server in the information system stores the time interval within which a key pair is valid. If a user attempts to use an "expired" key pair $K_i$ (i.e. the user opens a session on the information system in which he authenticates himself with the key pair $K_i$) then the information system denies him this.

Validity on the basis of number of uses: The server in the information system stores how often a key pair can be used as a maximum and how often it has already been used (i.e. how often a session has been opened using the key pair during authentication). If the number of uses of a key pair $K_i$ which has already taken place has reached its maximum number, the information system denies fresh use of $K_i$.

Validity on the basis of a nature of use: The server in the information system stores, for each key pair, which operations are admissible in a session which has been opened using the key pair during authentication. If the user attempts to perform an operation which is not admissible for the current session, the information system denies this.

Against this background, it is now possible to construct diverse further use scenarios which likewise vary just these features.

As an example, an electronic patient record may be cited, in the case of which a user (a patient) grants another user (a doctor) an access right to his own record, but merely for a maximum of five instances of access to the record and a time window of just one month; furthermore, the doctor is also permitted exclusively read access to the record of the patient. The patient thus generates a new key pair $K_P$, in the case of which the secret key $G_0$ from the key pair of the patient is encrypted with the public key $O_P$ of the doctor, and the cipher $C\_G_0\_O_P$ is stored publicly in the information system. This key pair is made available to the doctor by the patient. By way of example, this key pair may have been provided with attributes such that it can be used for a decryption operation only once. The key pair is then therefore in the form of a TAN.

Hence, within one month, the doctor now has five times the opportunity to open a session on the information system, within which he can merely read the record of the patient. Write access to the record of the patient or an attempt to allocate rights is rejected by the information system. When the time interval has expired, in the same way as after the fifth use, the doctor is no longer able to open a session using the key pair $K_P$ during authentication with the information system.

This preferably requires authentication of a user to the trustworthy station, so that access to the ciphers can be controlled accordingly.

In accordance with a further embodiment of the invention, the second private key and/or the private successor key and/or the private key from the first key pair from the arbitrary key pairs is received from a portable data storage medium. By way of example, the portable data storage medium is a chip card which may possibly also have a processor, wherein the method for generating the keys and/or encryption and decryption methods using the key pairs is/are performed by the processor of the portable data storage medium.

By way of example, the portable data storage medium may be a chip card, in one specific application the electronic health card of a patient.

In a further aspect, the invention relates to a computer program product having instructions which can be executed by a processor for the purpose of performing the method steps of the method according to the invention.

In a further aspect, the invention relates to a data processing system for generating a set of asymmetric cryptographical key pairs.

In a further aspect, the invention relates to a method for providing ciphers, wherein the ciphers are associated with a set of asymmetric cryptographical key pairs, wherein the set of key pairs has a directional graph structure, wherein the nodes in the graph represent the key pairs, wherein a dependency between a precursor key pair and a successor key pair, which directly follows the precursor key pair in the graph, is formed by a cipher, wherein the cipher is formed by encrypting the private key from the successor key pair with the public key from the precursor key pair, wherein the method comprises the cipher provision steps of:

reception of a first and a second identifier, wherein the first identifier is associated with a first instance of the nodes and the second identifier is associated with a second instance of the nodes, ascertainment of all ciphers which sequentially describe a dependency between the first instance of the nodes and the second instance of the nodes in the graph structure if such a path exists between the first and second nodes, provision of the ascertained sequence of ciphers.

The method for providing ciphers allows a set of key pairs and an arbitrary asymmetric cryptographical key pair from this set to be taken as a basis for providing a user with a sequence of ciphers which can be decrypted sequentially and successively by the user using his available key pair. Hence, on the basis of an arbitrary key pair belonging to a user, the sequence of ciphers can be used to provide a "path" of keys, so that finally the user can use his personal key pair to gain access to any other key pair which is situated in the path of the key pairs, starting from his personal key pair. To this end, the user merely needs to specify the first identifier, which identifies his personal key pair, and to specify the further identifier, which identifies that key pair to which the user would like to obtain access. The method according to the invention then automatically ascertains a path between these two key pairs, if one exists, by providing an appropriate sequence of ciphers, the sequential decryption of which on the basis of the key pair of the user allows access to the desired key pair (of the second node).

In accordance with a further embodiment of the invention, except for the key pair which forms the root node in the graph, every key pair in the graph is dependent on another key pair by virtue of at least one cipher.

In accordance with a further embodiment of the invention, the sequence of ciphers is ascertained and/or provided following successful authentication. This ensures, as already mentioned above, that unauthorized access to ciphers is prevented. Hence, ciphers can also be allocated appropriate classification features for the validity of key pairs within information system sessions. In this case, the ciphers are linked to classification features, wherein the classification features stipulate a validity for the ciphers, wherein the validity indicates that provision of the ciphers is intended to be prevented when the validity has expired, the ciphers being provided only when the validity of the ciphers has been successfully validated. Preferably, the ciphers in question are erased when the validity has expired.

In accordance with a further embodiment of the invention, the second identifier is associated with a data object, wherein the data object is encrypted with the public key from the key pair from the second instance of the nodes. In other words, preferably data objects from different users are encrypted with different key pairs belonging to the users, wherein, in the case of a graph in the form of a tree, the bottommost hierarchy level of the dependency tree, i.e. the "leaves" of the tree-like dependency hierarchy, represent those key pairs which are used to encrypt the data objects. Thus, if a user wishes to retrieve and decrypt one of his data objects, he needs to decrypt not only the encrypted data object itself but also all encrypted secret keys on one path in the dependency tree along the route from his key pair that is available to him, i.e. from the relevant node in the tree to the encrypted data object.

To perform this, the data decryption method comprises the steps of ascertainment of a private key by decrypting the first cipher in the sequence of ciphers with the private key from the key pair which is associated with the first instance of the nodes, ascertainment of a next private key for decrypting the next cipher in the sequence of ciphers with the previously ascertained private key and repetition of this step until the last cipher in the sequence of ciphers has been decrypted. The method for data decryption finally ends with the decryption of the encrypted data object.

Preferably, the step of data decryption and the cipher provision steps are performed by different data processing systems. In particular, the step of data decryption is performed by a trustworthy station. This means that the data processing system which manages and provides the ciphers does not at any time obtain information about any keys in plain text which are used for data decryption.

This ensures a high level of confidentiality for the data objects, since, for any user whose data objects are stored with such encryption in the information system, it is ensured that only he himself can decrypt the data objects. The operator of the information system who manages the ciphers has no access to the data objects of the user. Technical protection of the information system against seizure means that the secrets of the users which are required for decrypting the data objects must not be accessible to the operator of the information system at any time, resulting in the operator of the information system at no time having the opportunity to access data objects stored in encrypted form. By way of example, it is therefore possible to store the encrypted data objects in the information system together with the ciphers without, however, running the risk of the operator information system having the opportunity to decrypt the data objects.

This applies particularly if the operator of the information system makes an attempt to bypass a legal obligation to preserve the confidentiality of the data objects. By way of example, this could occur as a result of criminal machinations by corrupt insiders, for example administrators, or in the event of theft or seizure of the computer system on which the information system is running by government agencies with simultaneous publishing of the information system source code.

Figure 2:
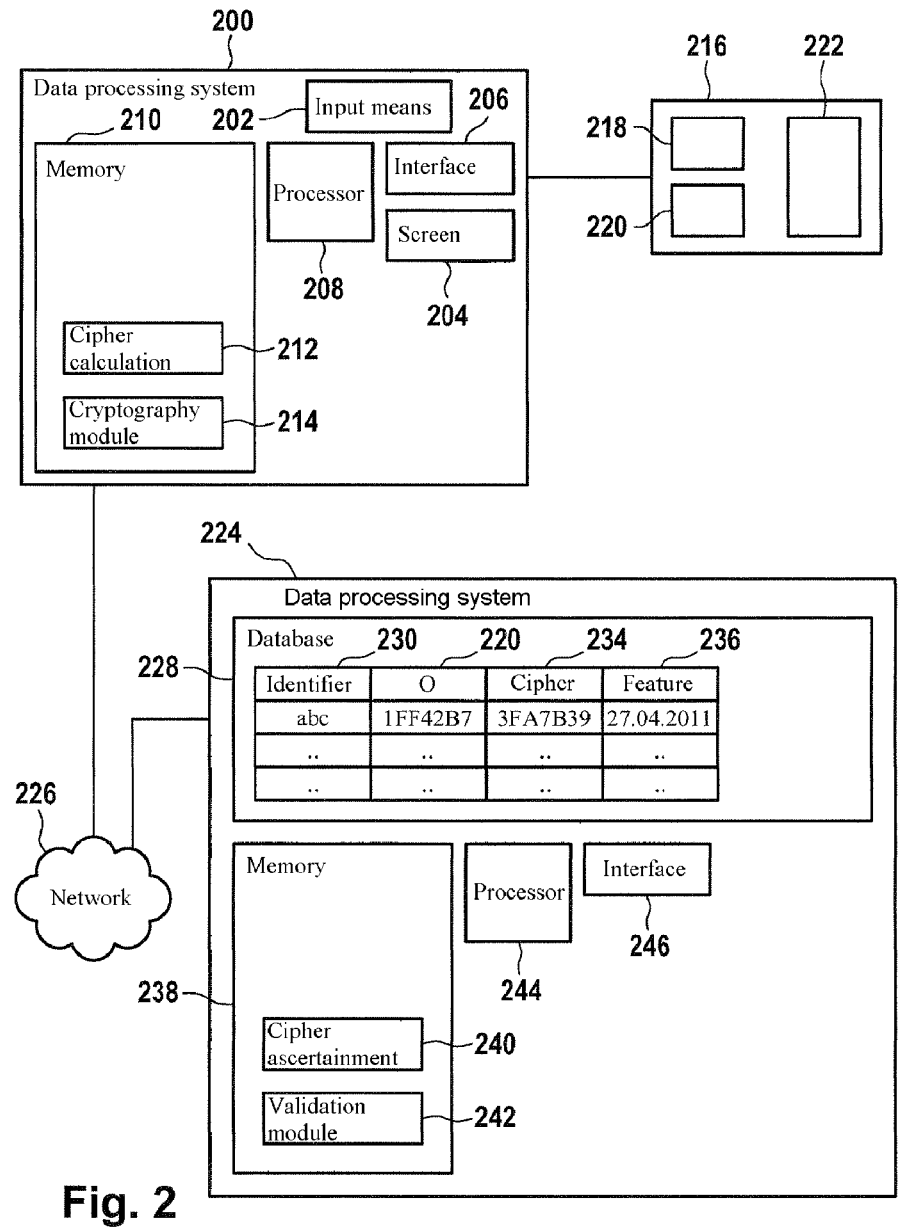
Figure 5:
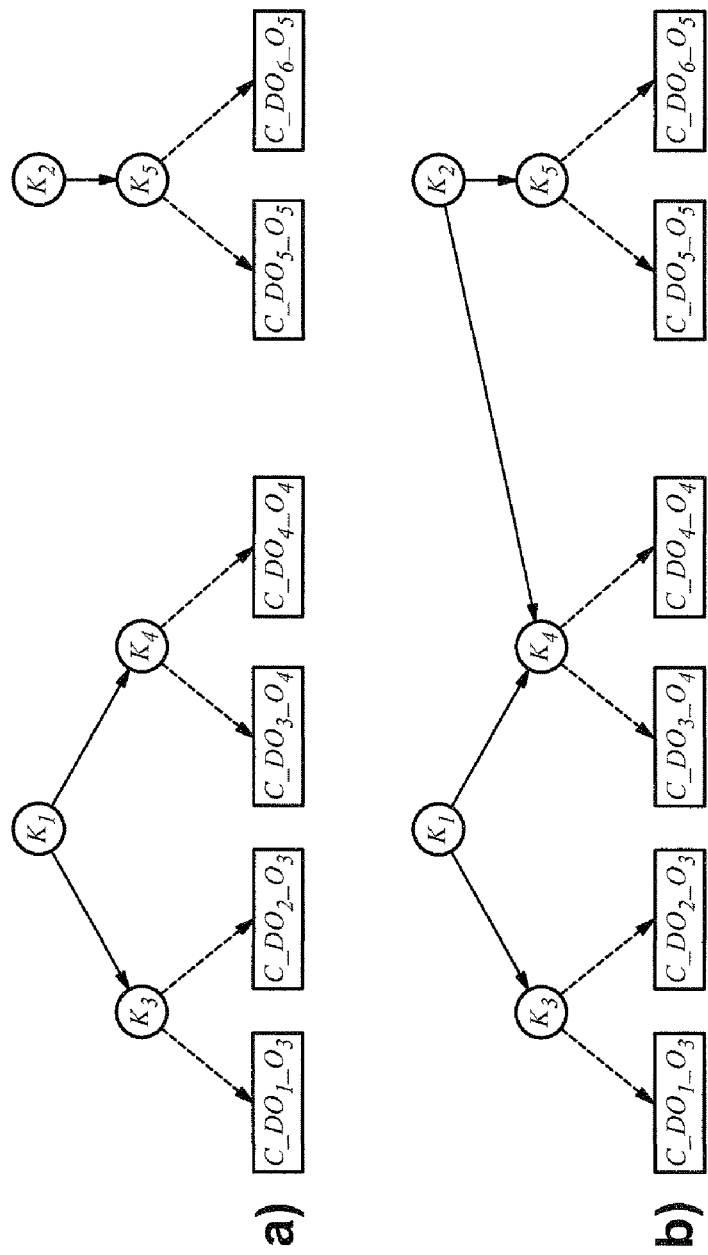
Figure 6:
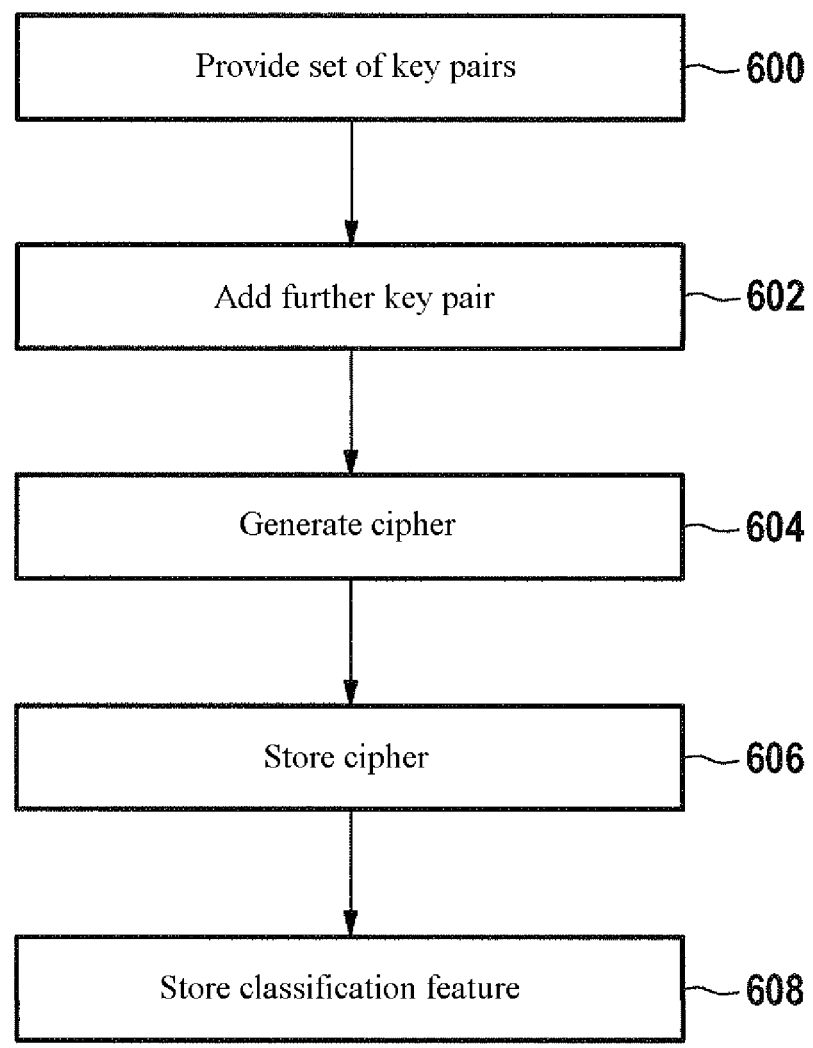
Figure 7:
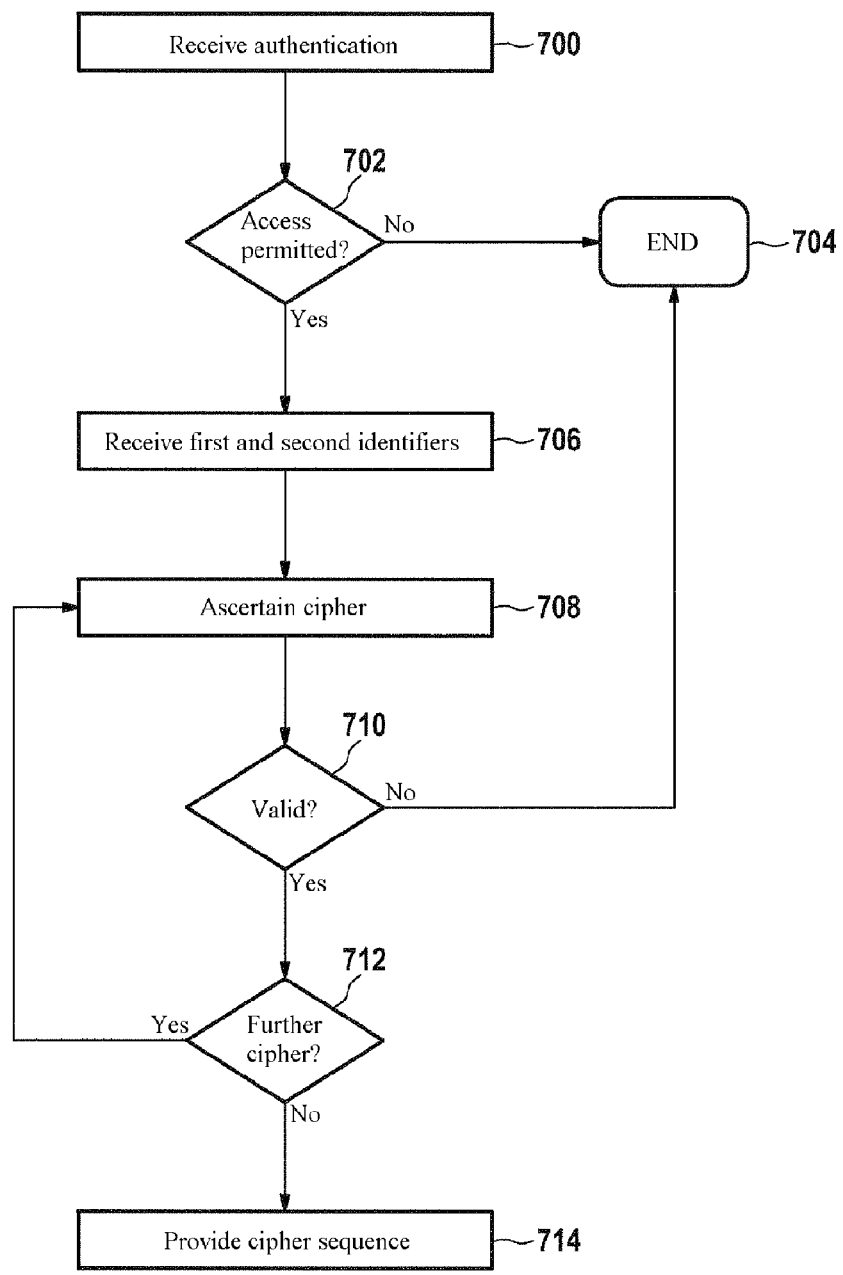

Embodiments of the invention are explained in more detail below with reference to the drawings, in which:

FIG. 1 shows a graphical representation of various steps which can be used to produce a graph structure in the form of a tree, FIG. 2 shows a block diagram of a data processing system, FIG. 3 shows a graphical representation of a cyclic dependency between two or three key pairs, FIG. 4 shows a graphical representation of a directional acyclic graph, FIG. 5 shows two dependency trees, before and after they are fused to form a directional acyclic graph, FIG. 6 shows a flowchart for a method for storing ciphers, FIG. 7 shows a flowchart for a method for providing a cipher sequence.

FIG. 1 shows a graphical representation of various steps which can be used to produce a graph structure in the form of a tree (FIG. 1c), which graph structure involves data objects being encrypted with leaf nodes. FIG. 1a shows a dependency between two asymmetric cryptographical key pairs $K_1$ and $K_3$, wherein the key pair $K_1$ is represented by the node 102 and the key pair $K_3$ is represented by the node 104. A link between the two key pairs is produced by virtue of the secret key $G_3$ from the second key pair $K_3$ being encrypted with the public key $O_1$ from the first key pair $K_1$. This results in the cipher 100.

So as now to furthermore add a key pair $K_2$, represented by the node 106, to the graph, FIG. 1b involves the performance of a further encryption process, in which the secret key $G_2$ from the key pair $K_2$ is encrypted with the public key $O_1$ from the first key pair $K_1$, which results in the cipher 108.

These steps can now be continued by adding any number of further key pairs to the graph in FIG. 1b and calculating and storing appropriate ciphers. Thus, in FIG. 1c, a further key pair $K_4$ has finally also been added on the basis of the key pair $K_1$ and an appropriate dependency has been produced.

While FIG. 1a shows a "1:1 dependency" from $K_1$ to $K_3$, FIG. 1b shows a further 1:1 dependency from $K_1$ to $K_2$, which thus states that a user who is in possession of the secret key $G_1$ from $K_1$ has access not only to the secret key $G_3$ from $K_3$ but also to the secret key $G_2$ from $K_2$.

Since, in this scenario, access to the secret key from a single key pair obtains access to the secret keys from a plurality of key pairs, this dependency is subsequently called a "1:N dependency". The simplest form of such a 1:N dependency is shown in FIG. 1b.

A further potential variation is the inclusion of a further key pair in the manner shown in FIG. 1c for the key pairs $K_3$ and $K_8$. In this case, the secret key $G_8$ from Kg is encrypted with the public key $O_3$ from $K_3$, and the corresponding cipher is stored. This adds to the already existing 1:1 dependency from $K_1$ to $K_3$ a further 1:1 dependency from $K_3$ to $K_8$. This means that a user who is in possession of the secret key $G_1$ from $K_1$ obtains access to the secret key $G_3$ from $K_3$ as a result of the storage of the relevant cipher $C\_G_3\_O_1$ and, as a result in turn, obtains access to the secret key $G_8$ from $K_8$ as a result of the storage of $C\_G_8\_O_3$. The 1:1 dependencies thus have a transitive effect, i.e. if there is a 1:1 dependency from $K_1$ to $K_3$ and also a 1:1 dependency from $K_3$ to $K_8$ then there is also a 1:1 dependency from $K_1$ to $K_8$. This transitive dependency is also called a 2-level dependency hierarchy.

The 2-level dependency hierarchy described above, comprising 3 key pairs, can now have any number of further key pairs added to it, and also a corresponding set of publicly stored ciphers for which the respective secret key from the successor key pair has been encrypted with the public key from the precursor key pair and there is thus a respective 1:1 dependency from the precursor key pair to the successor key pair.

On the basis of the above described principle of the transitivity of concatenated 1:1 dependencies, it is now true that a user who is in possession of the secret key $G_1$ from $K_1$ has, as it were, access to all secret keys $G_3, G_8, \ldots$ in the present n-level dependency hierarchy or, to be more precise, that a user who is in possession of one of the secret keys $G_i \epsilon \{G_1, G_8, \ldots\}$ has, as it were, access to all secret keys in this set which follow in the dependency hierarchy.

The dependency hierarchies in the form of a tree which are obtained in FIG. 1c can be defined as a dependency hierarchy H=(K, C), for which the following two conditions are satisfied:

For all key pairs $K_i \epsilon K$, except for a single key pair $K_k \epsilon K$, it is true that $K_i$ is never only dependent on precisely one $K_j \epsilon K$, where i≠j.

There is precisely one key pair $K_k \epsilon K$, which is not dependent on any $K_l \epsilon K$, where k≠l There will now be a description of how a graph, such as the graph in FIG. 1c, can be used for rights management in an information system. This involves consideration of an information system in which different users store data objects in encrypted form and can retrieve them again and which furthermore offers technical protection against seizure.

In this case too, the information system for each user B needs to have a hierarchy of mutually dependent key pairs $H=(K, C)=(\{K_0, K_1, \ldots K_n\}, \{C_1, \ldots C_n\})$ added to it.

Furthermore, the scenario has a further component added which will subsequently be called "trustworthy station". It can be positioned between the user and the information system and at that location performs the function that all encryption and decryption processes within its range are performed and can be isolated from the information system. All keys which are within its range in unencrypted form do not leave its range at any time. As input, it receives keys and data objects in plain text from the user and in encrypted form from the information system and, as output, merely outputs decrypted data objects to the user and encrypted keys and also encrypted data objects to the information system.

Furthermore, the data objects of the respective users in the information system are intended to be encrypted with different key pairs which each come from the bottommost level of the dependency tree, so to speak that the "leaves" of the tree-like dependency hierarchies. In this case, it is also possible for more than one data object to have been encrypted with the same key pair in the trustworthy station. FIG. 1c shows the tree including the encrypted data objects 116 by way of example.

When a user wishes to retrieve and decrypt one of his data objects, he needs to load into the trustworthy station not only the encrypted data object itself but also all encrypted secret key pairs on the path in the dependency tree along the route from the root of the tree to the encrypted data object. This is illustrated by the following example, which is shown graphically in FIG. 1c): When a user wishes to retrieve and decrypt the encrypted data object $DO_4$, he needs, to this end, to retrieve and load into the trustworthy station not only the data object itself in its encrypted form $C\_DO_4\_O_8$ but also the encrypted secret keys $C\_G_8\_O_3$ and $C\_G_3\_O_1$, since he himself has only the secret key $G_1$ from the key pair $K_1$, but the trustworthy station requires the secret key $G_8$ from the key pair $K_8$ in order to decrypt $C\_DO_4\_O_8$. With $G_1$, the trustworthy station decrypts the secret key $G_3$ from $K_3$ from the cipher $C\_G_3O_1$ and hence in turn decrypts the secret key $G_8$ from $K_8$ from the cipher $C\_G_8\_O_3$, which it can then finally use to decrypt the encrypted data object $C\_DO_4\_O_8$, which it finally outputs to the user in plain text.

FIG. 2 shows a schematic view of two data processing systems 200 and 224 which are provided for the purpose of using graphs for encryption and decryption processes and for the purpose of producing appropriate graphs, i.e. producing links between different sets of key pairs. Thus, by way of example, the data processing system 200 is used to calculate ciphers and to perform encryption and decryption processes on data, whereas the data processing system 224 is used for data storage and for ascertaining cipher sequences.

The data processing system 200 has input means 202, such as a keyboard, a mouse, and also input means which are suitable for receiving biometric features, such as fingerprints. In addition, the data processing system has a screen 204 and also an interface 206 which the data processing system can use to communicate with external appliances, such as a chip card 216 and a network 226 and hence the data processing system 224.

Using a processor 208, the data processing system 200 is capable of executing appropriate computer program instructions 212 and 214 which are held in a memory 210 of the data processing system. By way of example, the instructions 212 and 214 are a module 212 for calculating ciphers and a module 214 for performing cryptography processes, such as encryption and decryption processes, on data.

Besides an interface 246 which is designed for communication with the data processing system 200 via the network 226, the data processing system 224 has a processor 244 which is likewise capable of performing appropriate program instructions which are held in the memory 238 of the data processing system 224. By way of example, these program instructions may be program modules, such as a program module 240 for ascertaining a sequence of ciphers, and a program module 242 for validating the validity of a corresponding cipher.

In addition, the data processing system 224 has a database 228, the purpose of which is explained in more detail below with reference to an example:

It will first of all be assumed that, for the purpose of performing encryption and decryption processes, a graph structure is mapped in the database 228 which essentially reflects the graph structure in FIG. 1c. In this case, each node in FIG. 1c has an associated corresponding identifier 230 which can be used for node identification. A user has a key pair $K_3$, which has an associated identifier 230 "abc". The key pair $K_3$ comprises a private key 218 and a public key 220. The private key 218 is stored on a chip card 216 belonging to the user. The public key 220 is likewise stored on the chip card 216, and in the database 228, linked together to the identifier 230. The storage of the public key 220 in the database 228 does not infringe a secret in this case, since any user with knowledge of the public key 220 can merely perform a further encryption process on data, whereas data decryption is not possible with the public key 220.

Furthermore, storage of the public key 220 in the database 228 is advantageous particularly when this public key 220 is intended to be used to perform signature verification, for example. A data object is signed by virtue of a user signing the HASH value for the data object, for example, using his secret key. Any authorized user who has access to the database 228 is then capable of using the public key 220 to verify this HASH value so as to check whether the data object which is available to him is that data object which was previously signed by the user.

It is subsequently assumed that a user wishes to perform a decryption process on the data object 4 ($DO_4$). In this case, this data object 4 may be stored in the database 228, or it is possible to store the data object 4 in the memory 238 or to store in any external database. So as now to perform a decryption process, the relevant user requires the secret key $G_8$, since the data object 4 was stored in a form encrypted with the public key $O_8$. For this purpose, the user inputs into the data processing system 200 that he is in possession of the key pair $K_3$ and wishes to have access to the secret key $G_8$. The relevant identifiers 230 from the key pair $K_3$ and $K_8$ are then transmitted to the data processing system 224. The data processing system 224 then first of all uses the validation module 242 to check whether an appropriate provision process for the cipher $C\_G_8\_O_3$ is admissible in the first place. For this purpose, the database 228 is accessed, said database storing not only identifiers 230 and public keys, such as the public key 220 from $K_8$, but also ciphers 234 and classification features 236 therefor. By way of example, the identifier for the key pair $K_8$ may have a feature 236 stored with it in the form of a date which renders an expiry date for the key pair $K_8$. FIG. 2 specifies an expiry date Apr. 27, 2011 for the identifier "abc" and hence the key pair $K_8$. If the system date of the data processing system 224 is earlier than Apr. 27, 2011, the data processing system 224 will no longer transmit an appropriate cipher permitting decryption of $K_8$ to the data processing system 200.

It would subsequently be assumed that the key pair $K_8$ and hence the relevant cipher does not have a classification feature, and the data processing system 224 then starts to ascertain the cipher or ciphers which link the keys $K_8$ and $K_3$ to one another. This is done by executing the module 240. In the simple case of the key pairs $K_3$ and $K_8$, the result obtained is merely a cipher, namely the cipher $C\_G_8\_O_3$, which is then transmitted to the data processing system 200 via the network 226. In this case, the data processing system 200 is a trustworthy station, such as a certification station or a trust center. If the data objects under consideration are medical data objects, the trustworthy station is the doctor information system at a doctor's practice or a hospital or pharmacy information system, for example. The trustworthy station may generally also be a data processing system belonging to a health service provider who is intended to be able to display on his screen, with the consent of the user, appropriate medical data objects such as patient records, medical image data, prescriptions or the like.

In accordance with one embodiment of the invention, the data processing system 200 may also be a data processing system which runs on a separate protected hardware module. In this context, a trusted platform module (TPM) may be used, for example.

Thus, once the relevant cipher linking the key pairs Kg and $K_3$ has been transmitted via the network 226 of a data processing system 200, the cryptography module 214 can then first of all perform encryption of the cipher using the private key 218 of the chip card 216. Such a decryption process can either take place on the data processing system 200 itself, or else the processor 222 of the chip card 216 can perform the decryption process for the cipher, which has the advantage that the secret key 218 does not leave the chip card 216.

Following decryption of the cipher 234 and hence obtainment of the secret key $G_8$, the data object 4 ($DO_4$) can then be decrypted.

A procedure for calculating ciphers will now be presented below. In this context, it is assumed that a graph, as shown in FIG. 1a, is available. This graph from FIG. 1a, comprising the key pairs $K_1$ and $K_3$, is intended to be completed by adding a further key pair $K_2$. For this purpose, the key pair $K_2$ is first of all loaded into the data processing system 200. A cipher is then calculated in the data processing system 200 using the module 212 by encrypting the secret key $G_2$ from the key pair $K_2$ with the public key $O_1$ from the key pair $K_1$. This encryption process preferably takes place in the data processing system 200, but can take place using appropriate modules on a chip card which holds the key pair $K_1$. Following generation of the cipher, i.e. the cipher $C\_G_2\_O_1$, this cipher is transmitted together with an appropriate identifier to the data processing system 224, where it is stored possibly together with a classification feature 236.

FIG. 1c shows a directional acyclic graph in the form of a tree in which data objects are encrypted only with leaf nodes. The application of such hierarchic grouping and distribution of key pairs $K_i$ can advantageously be explained by way of example using the hierarchically designed management structure in a company and the communication requests arising therefrom. By way of example, for this purpose the hierarchy level 254 with the key pair $K_1$ has the associated communication subscriber "Management". The communication subscribers in the Management group are intended to be capable of accessing all encrypted data 116 in the company. The key pair $K_1$ allows this, since all other keys $K_2$ to $K_{11}$ can be obtained by means of appropriate ciphers using the key pair $K_1$.

Various divisions of the company may now be mapped in the hierarchy level 252 with the key pairs $K_2$, $K_3$ and $K_4$. By way of example, the key pairs $K_2$, $K_3$ and $K_4$ are associated with various division heads. Each division is in turn divided into various departments which occupy the hierarchy level 250. The departments each have keys $K_5$, $K_6$, $K_7$ etc. up to $K_{11}$. While any department on the hierarchy level 250 can access only the data objects which it has encrypted directly, the division heads are able to access the data which have been created and encrypted by the subordinate departments. Thus, for example, the key pair $K_2$ can be used to access all data objects which have been encrypted by departments with the key pairs $K_5$, $K_6$ and $K_7$. The Management, which, by contrast, is in possession of the key pair $K_1$, is able to access all the encrypted data objects 116.

In respect of FIG. 2, it should also be noted that particularly this makes it possible to ensure that the data processing system 200 is a trustworthy station when an appropriate authentication process for the data processing system 200 takes place with respect to the data processing system 224. Hence, the data processing system 224 can access the database 228 only if firstly appropriate authentication has taken place and secondly the features 236 permit access to the respective ciphers.

FIGS. 3a and 3b show a graphical representation of a cyclic dependency between two or three key pairs. In this case, dependency hierarchies do not form a chain, but rather form a ring of 1:1 dependencies.

This presents itself as being that in each case $C\_G_i\_O_{i-1}$, that is to say the secret key $G_i$ from the key pair $K_i$, encrypted with the public key $O_{i-1}$ from the key pair $K_{i-1}$, but additionally also $C\_G_1\_O_n$, the secret key $G_1$ from $K_1$, encrypted with the public key $O_n$ from $K_n$, is stored for a set $K_1, \ldots, K_n$ of key pairs for all $i \in \{2, \ldots, n\}$.

If a user now has the secret key $G_i$ from the key pair $K_i$ for any i from $\{1, \ldots, n\}$, he has access to the secret keys $G_{i+1}, \ldots, G_n$ from the key pairs $K_{i+1}, \ldots, K_n$, as already mentioned in detail; furthermore, however, he also has access to the secret key $G_1$ from the key pair $K_1$ on account of $C\_G_1\_O_n$, and hence also to the secret keys $G_2, \ldots, G_{i-1}$ from the key pairs $K_2, \ldots, K_{i-1}$, that is to say to all secret keys in the entire dependency hierarchy under consideration.

In a cyclic dependency hierarchy, any user who is in possession of the secret key from one of the key pairs from the dependency hierarchy thus has access to all other secret keys in the hierarchy, irrespective of which secret key the user has. FIGS. 3a and 3b show graphical representations of two cyclic dependencies for a set of 2 or 3 key pairs in the respective dependency hierarchy.

It should be noted that, from a strictly theoretical perspective, a cycle in a dependency hierarchy can be replaced by a single node which the users in a group can then access using an N:1 dependency hierarchy, for example.

FIG. 4 shows a graphical representation of a directional acyclic graph. A decisive factor in comparison with trees in the figure is now that an additional dependency has been produced between the key pair $K_3$ and the key pair $K_5$, for example, by an appropriate cipher. By way of example, the cause of the addition of this dependency between $K_3$ and $K_5$ may be that the user of the key pair $K_3$ is intended to be provided once with the opportunity to access data objects which have been encrypted using the key pairs $K_9$ and $K_{10}$. This link between the key pairs $K_3$ and $K_5$ is therefore a "single-use link", so that an appropriate cipher can be used only once, which is equivalent to TAN systems which are used in online banking, for example. It is thus possible to compel an appropriate cipher to be able to be used for only one session. As soon as single use of this cipher has taken place, the relevant cipher is flagged as "used" in the database of the information system and is preferably erased from the information system, so that the user of $K_3$ now cannot access the key pairs $K_9$ and $K_{10}$ a second time.

In addition, FIG. 4 shows that the key pair $K_{11}$ is dependent on two key pairs $K_5$ and $K_6$, for example. In other words, the key pair $K_{11}$ has both the key pair $K_5$ and the key pair $K_6$ linked to it by means of appropriate ciphers. If data therefore has been encrypted with the public key $O_{11}$ from the key pair $K_{11}$, access is possible both via $K_5$ and via $K_6$.

A specific application for such a dependency for a key pair by means of two different ciphers is explained in detail in FIGS. 5a and b. FIGS. 5a and b show two dependency trees, before and after they have fused to form a directional acyclic graph. In FIG. 5a, it is assumed that different users of an information system each have a dedicated tree with key pairs. By way of example, a user $B_1$ has the tree from FIG. 5a, which comprises the key pairs $K_1$, $K_3$ and $K_4$, whereas the user $B_2$ has the tree which comprises the key pairs $K_2$ and $K_5$. Instead of a set of key pair dependency trees existing side by side without overlap (each user of the information system has such a tree), the aim is now to permit the dependency trees to overlap, i.e. two or more dependency trees are permitted to fuse to form a directional acyclic graph.

The result of this is that this directional atypical graph can be used to set up a flexible rights system in which a user can clear selected portions of his data objects for another user and can also withdraw existing instances of clearance. This is explained in detail in FIGS. 5a and 5b.

In this example, two key pair dependency trees (FIG. 5a) are considered: The first tree, which is accessed by the possessing user $B_1$ via the key pair $K_1$, has two further key pairs $K_3$ and $K_4$ on the leaf level, each of these having been used to encrypt two data objects, $DO_1$ and $DO_2$ or $DO_3$ and $DO_4$. The second tree, which is accessed by the possessing user $B_2$ via the key pair $K_2$, has only one further key pair $K_5$ on the leaf level, this having been used to encrypt the data objects $DO_5$ and $DO_6$.

If user $B_1$ should now decide to make some of his data objects accessible to user $B_2$, for example the data objects $DO_3$ and $DO_4$, he can do this by adding to the key management in the information system (the set C of encrypted secret keys), which key management at this time comprises the elements $C\_G_3\_O_1$, $C\_G_4\_O_1$ and $C\_G_5\_O_2$, a further element $C\_G_4\_O_2 = V_4(G_4, O_2)$, which corresponds in the graph in FIG. 5b to an additional connection from node $K_2$ to node $K_4$.

As a result, the two dependency trees in FIG. 5a have been fused to form a directional acyclic graph, as shown in FIG. 5b, and user $B_2$ can access the data objects $DO_3$ and $DO_4$ of user $B_1$ by loading the encrypted data objects $C\_DO_3\_O_4$ and $C\_DO_4\_O_4$ and also $C\_G_4\_O_2$ into the trustworthy station, which then decrypts first $G_4 = E_A(C\_G_4\_O_2, G_2)$ and then $DO_3 = E_A(C\_DO_3\_O_4, G_2)$ and also $DO_4 = E_A(C\_DO_4\_O_4, G_2)$.

The withdrawal of already granted clearance for data objects can likewise be implemented very easily in this scenario, namely by erasing the relevant encrypted secret key from the dependency hierarchy of the relevant user. As a result, said key is no longer available to the user to whom the clearance was originally granted, which means that he can no longer have the trustworthy station decrypt the previously cleared data objects.

At this juncture, the function of the previously introduced trustworthy station becomes clear: it fulfills the purpose that users are provided with access to data objects cleared for them which belong to other users without knowing the associated secret keys with which these data objects are decrypted, since the secret keys do not leave the trustworthy station. If these secret keys were to enter the territory of the users at any time, it would not be possible to prevent corrupt users from "remembering" the keys, i.e. storing them using a manipulated client program or the like. In this case, it would be possible for a user to be able to decrypt data objects using an irregularly "remembered" secret key even following the withdrawal of clearance, which means that the clearance concept could be undermined. However, the introduction of the trustworthy station means that the concept of the use of 1:N dependency hierarchies retains its usability.

The keys are therefore provided only in a "trustworthy station". In this case, a "trustworthy station" is understood to mean any electronic appliance, such as a computer system, in which the data objects in need of protection are available in plain text and/or in which data for converting the data objects are available in plain text and/or which has access to such data.

A further concept for use of hierarchies is that a plurality of users $B_1, \ldots, B_n$ of an information system combine into a group B in which it is agreed that each user $B_i$ in the group is intended to be able to decrypt not only his own data objects but also the data objects of all other users $B_1, \ldots, B_{i-1}, B_{i+1}, \ldots, B_n$ from the group. To this end, each user $B_i$ from B grants the next user $B_{i+1}$ in the order clearance for his own data objects by encrypting the secret key $G_i$ from one of his key pairs $K_i$ with the public key $O_{i+1}$ from the key pair $K_{i+1}$ of the user $B_{i+1}$ and storing the cipher $C\_G_i\_O_{i+1}$ in the information system. Furthermore, user $B_n$ encrypts his secret key $G_n$ with the public key $O_1$ from the key pair $K_1$ of user $B_1$ and stores the cipher $C\_G_n\_O_1$ likewise in the information system. In this scenario, it is now possible for the trustworthy station to successively decrypt the secret key of any other subscriber for a subscriber in the user group B when the secret key is input by moving along the circular hierarchy, and hence in turn to decrypt all data objects which have been encrypted with any of the associated public keys. Any subscriber in B can thus access all data objects which have been encrypted by all other subscribers in B and put into the information system, but without knowing their secret keys.

Individual members can be included and excluded in this hierarchy; it is merely necessary to erase and re-add the relevant connections. When adding a new member $B_{n+1}$, the circular hierarchy is separated at a point, i.e. the connection $C\_G_n\_O_1$ is erased, for example, and the connections $C\_G_n\_O_{n+1}$ and $C\_G_{n+1}\_O_1$ are added.

Similarly, when erasing a member $B_i$ from the hierarchy, the connections $C\_G_{i-1}\_O_i$ and $C\_G_i\_O_{i+1}$ are erased from the hierarchy and a new connection $C\_G_{i-1}\_O_{1+1}$ is added to the hierarchy.

FIG. 6 shows a flowchart for a method for storing ciphers. The method begins in step 600, in which key pairs are provided in the form of a graph. This existing set of key pairs is now intended to have a further key pair added, which is done in step 602. A dependency is then produced between this further key pair and a corresponding precursor key pair from the provided set of key pairs by generating an appropriate cipher in step 604. For this cipher, the secret key from the further key pair is encrypted with the public key from the precursor key pair. The cipher generated in this manner is stored in an appropriate database in step 606. Step 608 with the storage of a classification feature is optional and can be used to restrict access to the cipher on the basis of time, on the basis of use or on the basis of number of uses.

FIG. 7 shows a flowchart for a method for providing a cipher sequence. First of all, an authentication is received in step 700 and is used to ensure that only an authorized user has access to the ciphers. If the result of the checking step 702 is that access to a relevant cipher is not permitted, the method ends in step 704. If, by contrast, the result of the checking step 702 is that access to ciphers is permitted, the system receives a first and a second identifier in step 706. By way of example, the first identifier identifies the key pair which is the key pair from which a decryption process for data is intended to take place. The second identifier either identifies the data object to be decrypted or identifies the last key pair in the sequence of key pairs, which key pair is intended to be used for a decryption process.

Steps 708, 710 and 712 then determine the ciphers which, for the relevant cipher decryption sequence, are situated on a path for the key pairs which is prescribed by the first and second identifiers if such a path exists. In order to search for such a path in the graph, it is possible to use various inherently known methods, e.g. in order to find a shortest path. Thus, in step 708, an appropriate cipher is transmitted and, in step 710, a check is performed to determine whether the cipher is valid. As already mentioned above, this may involve a validity based on time interval, a validity based on number of uses, a validity based on nature of use, etc. If the ascertained cipher is not valid, the method ends in step 704. If the cipher is valid, a check is performed in step 712 to determine whether a further cipher is necessary, i.e. whether or not the sequence of ciphers is complete. If the sequence is not yet complete, the method returns to step 708, whereas if the sequence is complete, the cipher sequence is provided in step 714.

LIST OF REFERENCE SYMBOLS

100 Cipher
102 Key pair
104 Key pair
106 Key pair
108 Cipher
116 Encrypted data objects
200 Data processing system
202 Input means
204 Screen
206 Interface
208 Processor
210 Memory
212 Module
214 Module
216 Chip card
218 Secret key
220 Public key
222 Processor
224 Data processing system
226 Network
228 Database
230 Identifier
234 Cipher
236 Feature
238 Memory
240 Module
242 Module
244 Processor
246 Interface
250 Hierarchy level
252 Hierarchy level
254 Hierarchy level

What is claimed is:

1. A method for generating a set of asymmetric cryptographical key pairs, wherein the set of key pairs has a first key pair and a second key pair, wherein the first key pair is formed by a first private key and a first public key and the second key pair is formed by a second private key and a second public key, wherein the first and second key pairs have an associated first cipher, wherein the first cipher is formed by encrypting the second private key with the first public key, having the following steps:
   adding a third asymmetric cryptographical key pair to the set of key pairs, wherein the third key pair is formed by a third private key and a third public key,
   generating a second cipher by encrypting the third private key with the first public key,
   storing the second cipher, wherein the third private key is received from a tangible portable data storage medium, wherein the tangible portable data storage medium has a processor,
   adding a fourth asymmetric cryptographical key pair to the set of key pairs, wherein the fourth key pair is formed by a fourth private key and a fourth public key,
   generating a third cipher by encrypting the fourth private key with the second public key,
   storing the third cipher,
   retaining the first, second, and fourth key pairs in a storage
   receiving from a user an identification of the first key pair and the fourth key pair and a request for a chain of ciphers linking the first key pair and the fourth key pair; and
   in response to the request:
      determining a link of dependencies from the fourth key pair to the first key pair, wherein a cipher formed by encrypting a private key of a key pair with a public key of another key pair provides a dependency between the key pair and the other key pair, the link of dependencies comprising a dependency between the fourth key pair and the second key pair and a dependency between the second key pair and the first key pair; and
      providing to the user the ciphers of the link of dependencies in response to the request, comprising the third cipher and the first cipher.

2. The method as claimed in claim 1, wherein one of the key pairs forms a root node, and except for the key pair which forms the root node, every key pair is dependent on another key pair by virtue of precisely one cipher.

3. The method as claimed in claim 1, wherein the set of key pairs has two arbitrary key pairs with one private and one public key each, also having the steps of:
   generating a third cipher by encrypting the private key from the first key pair from the arbitrary key pairs with the public key from the second key pair from the arbitrary key pairs,
   storing the third cipher.

4. The method as claimed in claim 1, wherein classification features are stored together with the ciphers, wherein the classification features stipulate a validity for the ciphers, wherein the validity indicates that use of the ciphers for data processing processes is intended to be prevented when the validity has expired.

5. The method as claimed in claim 4, wherein the classification features are a validity on the basis of time interval and/or a validity on the basis of number of uses and/or a validity on the basis of nature of use.

6. A system comprising:
   a data processing system for generating a set of asymmetric cryptographical key pairs, wherein the set of key pairs has a first key pair, a second key pair, a third key pair, and a fourth key pair, wherein each key pair is formed by a private key and a public key and wherein the first and second key pairs have an associated first cipher, wherein the first cipher is formed by encrypting the second private key with the first public key, wherein the data processing system comprises:

a cryptographical module to generate a second cipher by encrypting the third private key with the first public key and to generate a third cipher by encrypting the fourth private key with the second public key, and a storage component to store the first, second, third, and fourth key pairs and the first, second, and third ciphers, wherein the system is to:

receive from a user an identification of the first key pair and the fourth key pair and a request for a chain of ciphers linking the first key pair and the fourth key pair; and in response to the request:

determine a link of dependencies from the fourth key pair to the first key pair, wherein a cipher formed by encrypting a private key of a key pair with a public key of another key pair provides a dependency between the key pair and the other key pair, the link of dependencies comprising a dependency between the fourth key pair and the second key pair and a dependency between the second key pair and the first key pair; and provide to the user the ciphers of the link of dependencies in response to the request, comprising the third cipher and the first cipher.

7. The method as claimed in claim 2, wherein the ciphers are stored in a trustworthy station.

8. The method as claimed in claim 3, wherein:
the ciphers are managed and stored in a first data processing system; and
the method further comprises performing decryption and encryption operations with keys of the asymmetric cryptographical key pairs in a second data processing system, wherein the second data processing system receives the keys of the asymmetric cryptographical key pairs from a user in plain text and outputs decrypted data objects to the user and outputs the keys only in encrypted form to the first data processing system.

9. The data processing system as claimed in claim 6, wherein the data processing system is to determine access by members of an organization to the set of key pairs by mapping a management structure of the organization to the directional graph structure, whereby an element of the management structure mapped to a key pair has access to the key pair.

10. The data processing system as claimed in claim 9, wherein:
subscribers in a management group of the organization are granted access to a key pair at a root node of the set of key pairs;
division heads of the organization are granted access to key pairs one level below the root node; and
administrators of departments of the organization are granted access to key pairs two levels below the root node.

11. The method of claim 1, further comprising:
encrypting data with the fourth private key; and
decrypting the data by:
decrypting the first cipher by the first private key, thereby producing a copy of the second private key;
retrieving the stored third cipher;
decrypting the retrieved third cipher by the copy of the second private key, thereby producing a copy of the fourth private key; and
decrypting the encrypted data by the copy of the fourth private key.

12. The method of claim 11, further comprising decrypting the data by retrieving the fourth private key of the retained fourth key pair from the storage and decrypting the data by retrieving the fourth private key.

13. The method of claim 1, wherein the determining and the providing comprise requiring authentication from the user before providing the ciphers.

14. The method of claim 1, wherein:
classification features are stored together with the ciphers, wherein the classification features stipulate a validity for the ciphers, wherein the validity indicates that use of the ciphers for data processing processes is intended to be prevented when the validity has expired; and
the providing comprises:
checking the classification features of the ciphers of the link of dependencies; and
not providing the ciphers if the validity of any of the ciphers has expired.

15. The method of claim 14, wherein the determining and the providing comprise accessing a data base, the data base containing entries comprising an identification of a key pair, a public key of the key pair, a cipher obtained by encrypting the private key of the key pair by a public key of another key pair, and a classification feature of the key pair.

16. The storage component of claim 6 comprising a data base, the data base containing entries comprising an identification of a key pair, a public key of the key pair, a cipher obtained by encrypting the private key of the key pair by a public key of another key pair, and a classification feature of the key pair.

17. The method of claim 1, further generating a cyclic dependency hierarchy comprising:
a set of n asymmetric cryptographical key pairs wherein each pair $K_i$ comprises a public key $O_i$ and a private key $G_i$ and wherein $n >= 3$; and
a set of ciphers $C_i$ for $i < n$, wherein $C_i$ is formed by encrypting $G_{i+1}$ with $O_i$ and further comprising the cipher $C_n$ formed by encrypting $G_1$ with $O_n$.

* * * * *